Feb. 8, 1938. G. P. GEISSLER 2,107,982
HYDRAULIC ENGINE
Filed Sept. 25, 1935 3 Sheets-Sheet 1
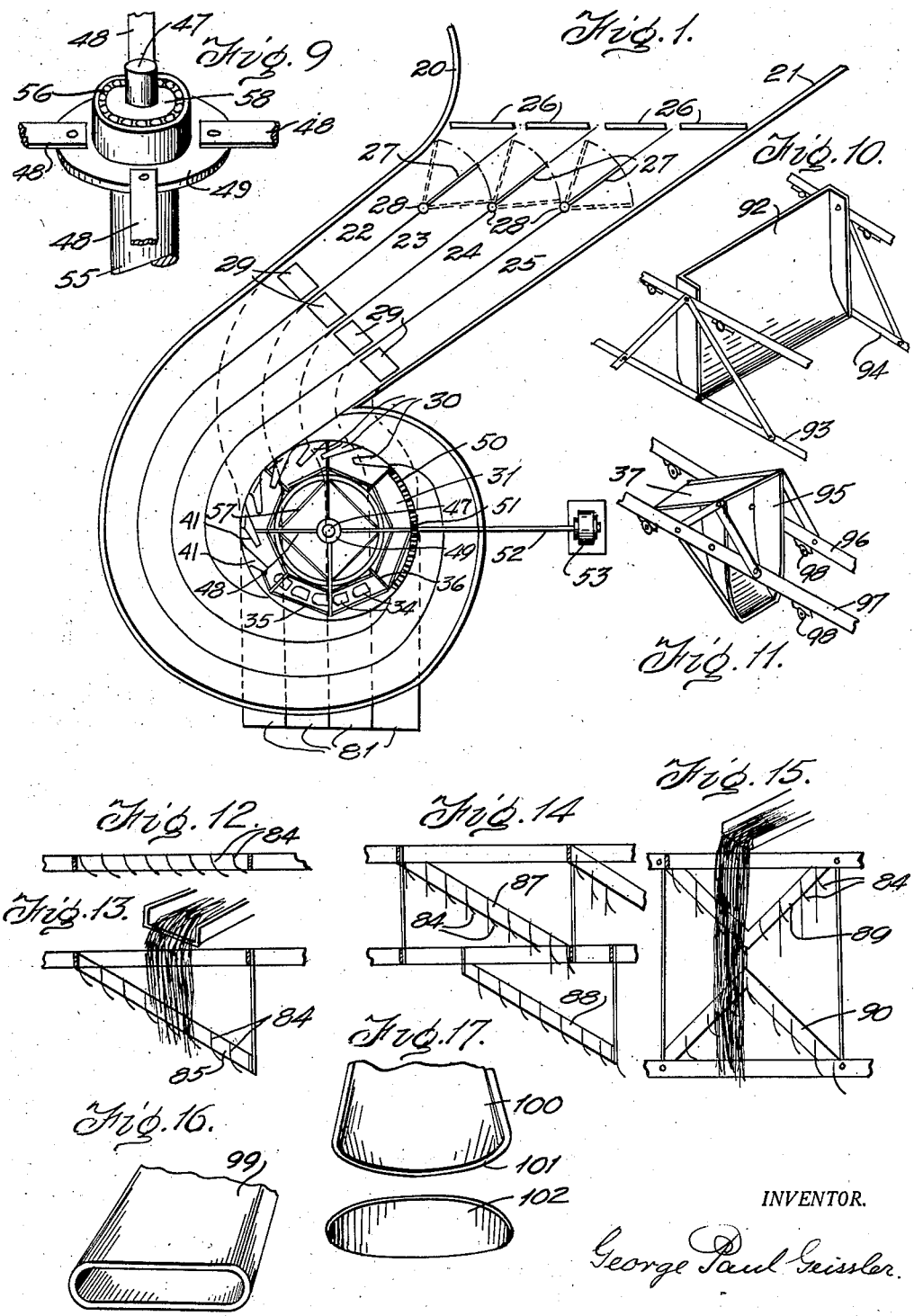
INVENTOR.
George Paul Geissler.

Feb. 8, 1938.  G. P. GEISSLER  2,107,982
HYDRAULIC ENGINE
Filed Sept. 25, 1935   3 Sheets-Sheet 2
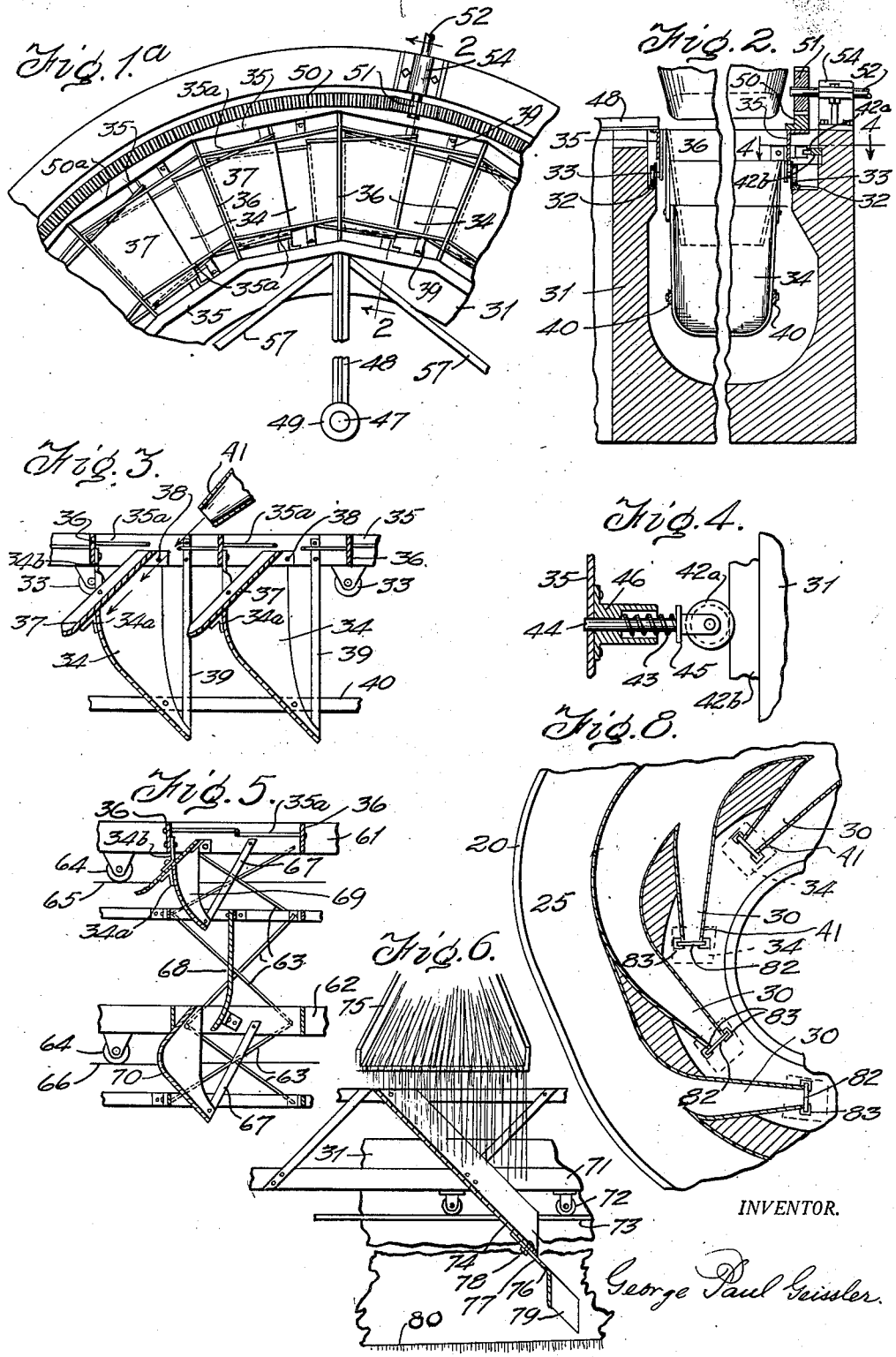
INVENTOR.
George Paul Geissler.

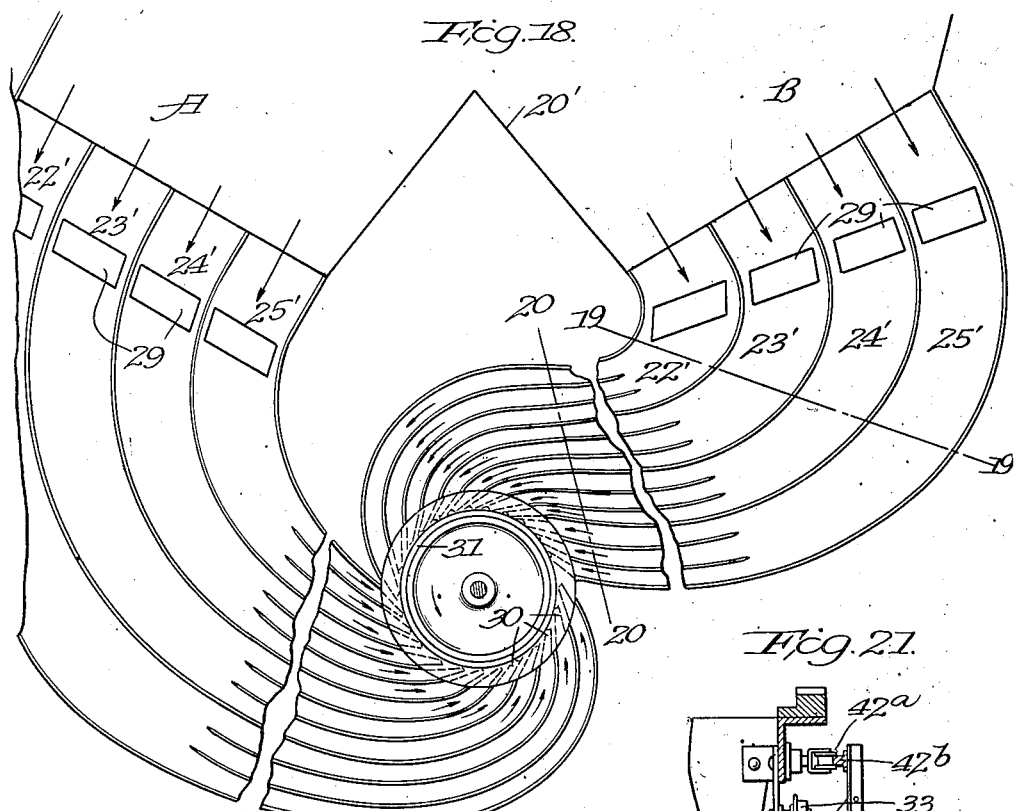
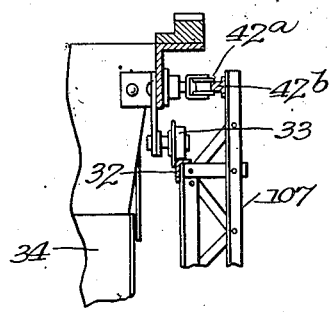
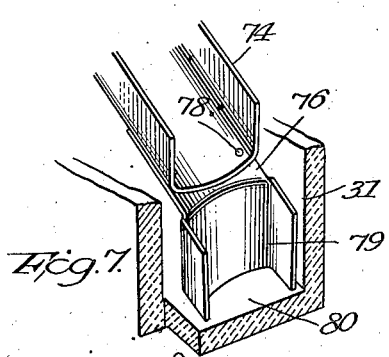
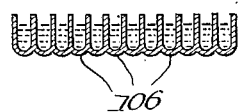

Patented Feb. 8, 1938

2,107,982

UNITED STATES PATENT OFFICE 2,107,982

HYDRAULIC ENGINE

George Paul Geissler, Washington, D. C.

Application September 25, 1935, Serial No. 42,092

17 Claims. (Cl. 253—159)

This invention relates to hydraulic motors or engines and it is designed primarily for the purpose of utilizing the motive force of the water in shallow rivers or in connection with the ebb and flow of tides in order that the said force will be made available for industrial purposes.

Heretofore the utilization of the forces of small flowing streams or shallow rivers and the forces of the tides have been neglected on account of the excessive cost of providing mechanical means to be operated by the movement of the water and the provision for directing the current of water to the mechanism to be operated thereby, hence this invention is of a simple and comparatively inexpensive installation and effectively uses the aforesaid currents.

It is a further object of this invention to provide power developing means which may be substituted for the well known water wheels or turbine wheels, since the invention may be employed where there is present waters of "high head", or it may be employed to great advantage in developing the power of shallow rivers in which turbine wheels or other known hydraulically driven wheels would be impracticable.

A further object of the invention is to produce an hydraulic engine, the installation of which is comparatively inexpensive so that it could be employed by small communities or such individuals who would be unprepared financially to install the engine if the constructions of powerful dams or the like were required.

It is a further object to produce an hydraulic engine of the character indicated which will develop the horse power without the construction of dams, the impounding water by which dams as now constructed floods valuable fertile river bottom lands and removes them as cultivated areas of farm lands.

It is a still further object of this invention to render it possible to utilize the ebb and flow of tides without the necessity of locating a suitable coast formation, as the invention can be operated profitably for the hours during the running of the tide, even though it remains idle during the other hours that the tide is ebbing.

It is further possible to install the hydraulic engine at the nearest meeting points of the two great oceans, one of which has a permanently high level and the other a permanently low level, so that in such locations the hydraulic engine of the invention could be continuously operated.

The embodiment of a means for carrying the invention into effect consists in a mechanism, mounted for movement in a horizontal or substantially horizontal plane on an annular guiding means, and for rotation on a vertical axis, without an axle, spokes and hub, but having means impinged by water, under suitable control, conducted thereto, and means for power transmission.

By providing this instrumentality or rotating wheel with a suitable trunnion, it may be used directly to drive a large connecting rod connected to machinery which is to be driven. Suitable means may also be constructed to employ the instrumentality or wheel as a support for a rotor of unusual dimensions. Finally this instrumentality or wheel may be provided with means to convey its motion to machinery to be driven through the use of gears or by employing cables which operate in the nature of belts which are driven as the instrumentality or wheel rotates.

In the present embodiment of the invention there is illustrated the installation of the motor in which motion is transferred through gear wheels, but I am fully aware that many modifications thereof are possible. My invention, therefore, is not to be restricted except in so far as is necessitated by the prior art and by the spirit of the appended claims.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of an installation in which the invention is embodied;

Figure 1a illustrates a plan view of a fragment of the mechanism on an enlarged scale;

Figure 2 illustrates a sectional view on the line 2—2 of Figure 1a;

Figure 3 illustrates a vertical sectional view of a fragment of the device taken approximately centrally of Figure 2;

Figure 4 illustrates a sectional view on the line 4—4 of Figure 2;

Figure 5 illustrates a sectional view of a fragment of an installation modified from that shown in Figure 3;

Figure 6 illustrates a sectional view of an installation embodying a further modification;

Figure 7 illustrates a perspective view partly in section of the lower portion of the blade or baffle and the apron illustrated in Figure 6;

Figure 8 illustrates a horizontal section of a fragment of the sluices and the nozzles or pipes leading therefrom;

Figure 9 illustrates a detail view of the central guide post with guide rods, race and flanges; connecting with the water-driven instrumentality;

Figure 10 illustrates a perspective view of a bucket of modified construction;

Figure 11 illustrates a perspective view of another modification of a bucket having much greater dimensions, but shown on a smaller scale;

Figure 12 illustrates the water-driven instrumentality having blades that are shallow as compared with the buckets of Figures 2, 3, 5 and 11;

Figure 13 illustrates an arrangement in which the same type of bucket or blade is supported on an incline arranged to receive the impact of water descending from a sluice thereabove;

Figure 14 illustrates a further modification in which the two sets of buckets or blades are supported in an inclined position and stepped vertically;

Figure 15 illustrates a further modified arrangement of means for supporting the buckets or blades;

Figure 16 illustrates a perspective view of a transversely elongated nozzle designed for use with buckets shown in Figures 2, 3, 5, 10 and 11;

Figure 17 illustrates an open fan shaped flume having a semi-elliptical rim and an elliptical blade designed to be installed as shown in Figures 12 to 15;

Figure 18 illustrates, more or less diagrammatically, a plan view of a modified arrangement of dams and sluices in an installation in which the invention is embodied;

Figure 19 is a vertical transverse section taken through the sluices of Figure 18, as on the line 19—19;

Figure 20 is a vertical transverse section taken through the sluices of Figure 18, as on the line 20—20;

Figure 21 is a detail fragmentary view, partly in vertical section, illustrating a form of an open skeleton or frame structure for mounting and supporting the rotary annular frame.

In order to trap the water in a stream and direct it to the engine, dams 20 and 21 may be provided which converge from opposite banks of the stream to locations where the stream is most active and the current the swiftest. The distance between the dams 20 and 21 will be determined by the number of sluice ways such as 22, 23, 24, and 25, and the dams will be provided with suitable sluice gates such as 26, one of which will guard each of the sluices and they, of course, will be suitably operated.

Means for regulating the flow of water through the sluices may also be provided and they are shown as regulating gates 27, each of which is mounted on a pivot or shaft 28. The sluices taper in width and are of lesser capacity at the trap doors 29 than they are at their outer ends. The trap doors are to be mechanically operated for opening the sluices to permit escape of water when the engine is to remain inoperative and for closing when the flow of water is to pass the trap doors. The sluices discharge through nozzles with shutters, spouts or flumes 30. The gates may be operated independently or in unison as may be desired. Their object is to deflect the water of one sluice into an adjoining sluice to reenforce the current in said sluice, when that becomes necessary. While no safety outlets for the dam have been provided in this illustration, the emergency trap doors 29 are provided in the sluices, and other known regulating devices may be employed in an installation.

The sluices have a flat bottom between the sluice gates 26 and the trap doors 29, from which latter points the bottom becomes more and more concave such as illustrated by the concave bottoms 105 and 106, of the sluices of Figures 19 and 20 of the drawings. But this feature may be modified by local requirements. The outlets of the sluices may be pipelike or funnel shaped, as may be most advantageous, are provided with nozzles, spouts or flumes 30, as stated before, are arranged radiatingly and discharge over a pit or structure 31, where the water-driven instrumentalities are mounted.

The bottom of this structure or pit 31 is slanting so as to facilitate the escape of the water, which is carried off through tunnels 81. It may be divided into as many sections as there are sluices, each section having its own slant terminating in a troughlike depression in front of the tunnel inlet 81. The pit 31 is provided with guides, tracks or rails 32 on which the flanged wheels 33 of the bucket supports travel. These carrying devices may resemble trucks having side beams 35 with reenforcing rods 35a, on the former of which or on the cross bars 36 the wheels 33 may be mounted. The beams 35 are connected by cross bars 36 to which, as shown in Figures 3 and 5, the angular parts 34a of the buckets are fastened by means of the supporting rods 34b. The buckets are also provided with deflector plates 37 which are anchored to the said buckets and to the beams 35 by suitable fastenings 38 such as rivets or the like, or the joints may be formed by the well known welding process. These deflector plates bridge the space between the buckets to which they are attached and the bucket immediately ahead of them. The purpose of this plate or apron is to deflect that part of the falling water which would otherwise pass between the two buckets unused, into contact with the advancing bucket and add its force to the water which strikes the bucket in its emergence from the nozzle. Braces 39 are also attached to the beams 35 and extend downward to the side of the buckets, to which the said braces 39 are attached. These braces and buckets are also secured to a longitudinally extending bar 40 which strengthens the structure and produces with the other elements described the frame of the truck. The discharge end or nozzle 41 of the spout which delivers the water to the buckets is located above the path of travel of the frames or trucks and discharges in the direction of the movement thereof.

In order to guard against lateral movement of the frames or trucks under centrifugal force, a plurality of yieldably mounted rollers 42a may have their peripheries engage a rail 42b or other known guiding means on the inner wall side of the pit 31, and the said wheel may yieldingly be held by a spring 43 on the shaft 44 of the wheel mountings 45, it being shown that the said shaft is slidable in a bracket 46 that may be secured to the cross bar 36 of the frame. The whole frame structure is rigid so that it forms the rim of a wheel that has neither spokes, nor a hub nor an axle, and travels on a circular track in a horizontal plane.

While provision is made for preventing outward movement of the frame under the influence of centrifugal force, as shown in Figure 4, the frame may also be connected to a central shaft 47 by means of guide rods 48 which radiate from a flange or collar 49 that rotates on ball bearings 56 around the race 58. The guide rods 48 may be connected to the flange 49 and to the trucks or frame in any suitable manner, and their outer ends may be connected inter se by rods 57 or other suitable means. The race 58 rests flatly on top of the post 55 and may be used as a base for any superstructure that may be needed for the housing of the centrally located regulating devices and the stand of the operator. Both means of counteracting centrifugal force may be employed either in conjunction or independently.

Provision is made for transmitting the motion of the frame or trucks to a location where the power is to be used, and to accomplish this result, the frame has a circular rack 50 firmly secured to it which drives a pinion 51 on the shaft 52, which shaft drives a power transmitting pulley or wheel 53. The shaft is journaled in a suitable bearing 54 on the outer wall of the pit 31.

From what has been said, it is apparent that the dams direct water to the sluices and the water passing therethrough is controlled or diverted and when wanted for driving the engine or motor finds its way through the sluice to the nozzles from whence it is discharged over the frame or trucks so that the said water impinges the buckets and forces the said frame or truck to travel on the track or rails and transmits power in the manner described. The water escapes through tunnels 81 into the river below the dam.

There are modifications of some of these instrumentalities which will now be described.

In Figure 5 the trucks or frames 61 and 62 are provided with a series of braces 63 between them and each truck may be provided with wheels 64, the upper truck having its wheels on a suitable track 65 and the lower truck having its wheels 64 on a track 66. In this embodiment of the invention the buckets are secured to the frames or the trucks in any suitable manner but are here shown as having a brace 67 secured to the lower end of the bucket and to the truck beam, such as has been described in connection with the disclosure of Figure 3. Water is, of course to be delivered to the buckets above the trucks in substantially the manner water is delivered in Figure 3. A deflector plate 68 is anchored to the frame structure near the discharge end of the upper bucket 69 and the said deflector plate is curved toward the upper end of the lower bucket 70, hence the water which is discharged from the upper bucket 69 is guided by the deflector plate 68 to the lower bucket and the water acts on the bucket to exert force in the direction of movement of the truck. The curvature of the rear walls of these buckets furthermore utilizes the force of the water to the best advantage and insures a high percentage of efficiency.

In that form of the invention shown in Figure 6, the frame structure 71 is supported by wheels 72 on a track 73 and deflector or baffle plates 74 are mounted in an inclined position on the trucks. The deflector plates are of relatively narrow width but have a deeply curved bottom, into all parts of which the water falls simultaneously like a sheet. The yielding of these plates to the pressure of the falling stream of water is however different from that described with regard to Figures 3 and 5. For the rim of the sluice or trough 75, which latter runs in a radial direction to the pit, is either tangential or parallel to the center line of the pit. The water that falls over this rim therefore forms a complete circular wall or sheet all around the pit, while with all the other modifications the water falls cross wise to the direction of the movement of the trucks thus dividing the path into as many sections as there are sluice-outlets or nozzles. There are more of these deflector plates than buckets, since they can be arranged more closely together. Each deflector plate or gutter 74 is provided with an extension 76 having slots 77 to receive fastenings 78, such as bolts or the like, by which extensions the aprons 79 are adjustably connected to the deflector plates. It is seen that the said aprons have downwardly extending flanges which depend in proximity to the bottom 80 of the pit 31. The bottom is inclined as clearly indicated in Figure 6 of the drawings so that the water discharged into the pit flows in the direction of movement of the trucks and at suitable locations the water escapes from the pit through conduits or tunnels 81, as stated above. The flanges of the aprons therefore come under the influence of the escaping water as it flows through the pit and this aids further in propelling the trucks.

In Figure 7 the flange is shown in relation to the bottom of the pit.

As shown in Figure 8, the discharge ends of the nozzles 30 are provided with movable closures 82 held in place by guides 83. These closures may be opened or closed to any extent desired for the purpose of controlling the water discharging from the nozzles.

In Figures 12 to 15 there is illustrated a modified type of bucket in which the curved plates or baffles 84 are relatively narrow, but they are of such length as to preferably extend between the side members of the frame of a truck. In Figure 13, the plates of the character indicated are shown as held by an inclined support 85 and water is delivered to them through a suitable flume which as in all other buckets except the deflector plates of Figure 6 extends cross wise to the pit and at right angles to the movement of the trucks. In Figure 14, the plates of the character indicated are held by superimposed inclined members 87 and 88 and the plates of one support are stepped longitudinally of the truck with relation to the plates of the other support, so that water which has passed the upper blades strikes the lower ones, and thus a double action of the water is obtained.

In Figure 15 the deflector plates are shown as being held by supports 89 and 90, V-shaped and inverted V-shaped respectively, and in this arrangement the upper blades are stepped with relation to the lower blades.

It will be understood that in all of the different types of pipes, flumes or nozzles may be employed in connection with any of the buckets or baffles or blades as they may be interchangeable without departing from the spirit of the invention.

In Figure 10 there is shown a bucket 92 which is intended to be very broad and shallow, and it may receive its impulse from an oblong flume extending the full width of the pit in which the truck is mounted, more particularly in connection with arrangements shown in Figures 12 to 15. The bucket 92 is conventionally shown as being held by frame members 93 and 94, whose description it is thought need not be repeated.

In Figure 11 there is shown a bucket 95 which is intended to have the capacity of two or three of those of Figure 3 or 5. It is mounted on a low sitting frame comprising members 96 and 97 provided with suitable wheels 98 which run on the rails 32 of the pit 31. It is provided with a deflector plate 37 and may also have an apron 79. To give it the necessary rigidity it may be provided also with all the necessary braces and reenforcing rods described in other modifications.

Figure 16 illustrates a flattened nozzle 99 for delivering water to a truck having relatively narrow buckets such as shown in Figure 11, while Figure 17 illustrates a flume 100, fan-shaped in plan, and provided with a semi-elliptical rim 101 discharging into an elliptical, concave blade 102.

While the foregoing description of the hydraulic engine assumes it to be intended primarily for low water heads, it is by no means restricted to them, and instead of being built in the ground it may very well be built above the low water level of the river if it has a high head of water. In such a case the stationary masonry or concrete pit or channel may be replaced by an open skeleton or frame structure 107 with the ledges for the track, and be well braced in every direction, as iron or frame structures of this kind usually are, as clearly indicated by Figure 21 of the drawings. Depending on the available water supply and height of the structure some of the modifications described in the foregoing lines may become preferable and more advantageous than the ones of the original plan of the low structure of the pit.

Attention is directed to the fact that in rivers with readily shifting main channels, it may be found advantageous to build a W-shaped dam such as illustrated in Figure 18 of the drawings. With the W-shaped dam of Figure 18, sluice gates, such as the sluice gates 26 hereinbefore referred to in connection with Figure 1 are provided at each of the down stream angles A and B of the dam, the sluices 22', 23', 24' and 25' of the down stream angles A and B respectively running in opposite directions, those of angle A being directed to the down stream semi-circle of the pit 31, and those of angle B being directed to the up stream semi-circle of said pit. The water is thus delivered by the set of sluices of the dam angles A and B at diametrically opposite points of the pit 31. The modus operandi of the sluice arrangement of Figure 18 is the same as that hereinbefore described in connection with the single sluiceway provided by the dams 20 and 21 of Figure 1.

I claim:

1. In a hydraulic engine, in combination, a stationary circular structure providing an annular channel having a substantially unobstructed open top and a substantially closed bottom portion, an annular frame providing a rotary member mounted in said circular structure above said bottom portion, means for guiding said annular member for rotation in a horizontal plane on and around a circular path formed by the said structure, a series of water impinged elements mounted on said annular member at spaced intervals there-around, means for delivering water successively against said elements in a direction to cause rotation of said annular frame, said annular frame and water impinged elements thereon arranged for discharge of water downwardly therefrom into the annular channel provided by the bottom portion of said stationary structure, and said water impinged elements including means carried thereby and depending therefrom into the flow of water around said channel whereby such flowing water imparts additional rotating force to said rotary annular frame.

2. In a hydraulic engine, in combination, a stationary structure providing an annular channel disposed in a horizontal plane and having a substantially unobstructed open top and a bottom wall forming an annular water channel having a water outlet therefrom, an annular rotatable frame member mounted in the upper portion of said annular channel and means associated with said member for guiding and confining the same in the stationary channel-forming structure for rotation through a circular path in a horizontal plane, water impinged elements fixed on said annular frame member for causing rotation of the member in a desired direction, means for directing water against said elements, said channel bottom formed to receive the water discharged from said elements and to cause the water to flow through the channel in the direction of rotation of said annular frame member, and said water impinged elements including means carried thereby and depending into the flow of water through said channel.

3. In a hydraulic engine, in combination, a circular track structure disposed in a horizontal plane, an annular structure mounted for rotation in a horizontal plane on and around said track, water impinged elements supported on the rotatable annular structure at spaced intervals there-around and having the water impinged surfaces thereof shaped to cause rotation of said annular structure in a predetermined direction under the influence of water impinging such surfaces, means for delivering water against said surfaces of the elements, and the said water impinged elements each having an inclined deflector extended into the space between adjacent elements and in the direction of the movement of the rotating annular structure to guide the water from said water delivering means as said elements successively rotate therepast and thereby reduce the loss of the turning force from the water.

4. In a hydraulic engine, in combination, an annular rotatable frame member, means for guiding said member within a stationary structure in a circular path in a horizontal plane, a series of vertically disposed blades mounted on said annular frame member at spaced intervals there-around, means for impinging water against said blades successively to cause rotation of said annular member in the circular path within said stationary structure, and water deflection plates mounted and supported on said blades, respectively, each of said plates in such a position relative to adjacent blades and to said water impinged means as to reduce the wasteful passage of water between and out of engagement with the blades as the blades are rotated past said water impinged means and to thus direct said water against the blades to thereby minimize loss of the turning force of the water.

5. In a hydraulic engine, in combination, a stationary structure providing a circular track in a horizontal plane, an annular frame confined and guided on said circular track for rotation thereon through a circular path in a horizontal plane, a series of water impinged elements mounted on said annular frame at spaced intervals there-around, said stationary structure providing an annular channel beneath said track and said annular movable frame, said channel having a bottom wall formed and constructed to cause water to flow in the channel in the direction of movement of the annular rotatable frame, and means for directing water against said water impinged elements to cause rotation of the annular frame, the bottom wall of said channel receiving water from said water impinged elements.

6. In a hydraulic engine, in combination, a stationary structure providing an annular open top channel having a circular track around the upper portion thereof in a horizontal plane and a water receiving bottom wall below said track, an annular frame member rotatably mounted and confined on said track, water impinged elements mounted on said rotatable annular frame member at spaced intervals there-around, normally stationary water delivering means at spaced intervals around and above said annular frame member for directing water against said water impinged elements to cause rotation of said frame member in a desired direction in a horizontal plane on said circular track, said bottom wall of the channel collecting water falling from said water impinged elements on said annular frame member there-above, and outlet means for flow of the collected water from said channel.

7. In a hydraulic engine, in combination, a stationary structure providing an annular open-top and substantially closed-bottom annular channel having a circular track there-around in a horizontal plane adjacent the open-top thereof, an annular member movably mounted on said track within said channel for rotation thereon, water impinged elements mounted on said member at spaced intervals therearound, a series of relatively stationary water delivering means spaced around said annular rotatable member for impinging water against said water impinged elements to cause rotation of said annular member in a predetermined direction on said track, a source of water supply, and a series of sluices in communication with said supply and leading to said water delivering means, respectively.

8. In a hydraulic engine, in combination, a stationary structure providing a substantially open-top annular channel, an annular hydraulically impelled member guided and confined in the upper portion of said stationary structure for rotation therein in a circular path in a horizontal plane, a series of water impinged elements mounted on said rotary annular member, a series of water delivering means positioned at spaced intervals around said stationary structure for impinging water successively against said member carried elements to cause rotation of the annular member in said stationary structure, a source of water supply, a series of sluices receiving water from said supply and leading to said water delivering means, respectively, each of said sluices curving a distance around said stationary channel forming structure to the respective water delivering means supplied with water from such sluice.

9. In a hydraulic engine, in combination, a circular track within a stationary structure, an annular frame mounted for travel in a circular path in a horizontal plane on and around said track, water engaging elements mounted on said annular frame at spaced intervals there-around adapted to be engaged by water to impell the annular frame, water delivering sluices leading from a source of water supply to locations, respectively, spaced around said stationary structure, each of said sluices having a water delivering means terminating and discharging above said rotatable annular frame for directing water against said elements to impell said annular frame on and around said stationary track.

10. In a hydraulic engine, in combination, a circular track in a horizontal plane within a stationary structure, an annular rotatable frame mounted for travel on said circular track in a horizontal plane within said stationary structure, a series of water engaged elements mounted on said annular frame at spaced intervals there-around, a series of water delivering sluices leading from a source of water supply to locations respectively spaced around said stationary structure, each of said sluices terminating above the movable annular frame in water delivering means positioned to direct water against said water engaged elements to cause rotation of said annular frame, means for controlling the flow of water through said sluices, and mechanism operatively associated with said annular frame for transmitting power therefrom.

11. In a hydraulic engine, in combination, a source of flowing water, a series of sluices located at their intake ends to receive water from said source, water guiding wall means for directing water into said sluices, a circular stationary structure providing a horizontally disposed open-top and substantially closed-bottom annular channel, a circular track means in the upper portion of said channel in a horizontal plane, a water impelled unit embodying an annular frame mounted on said circular track means within said channel for rotation thereon in a horizontal plane, a series of water impinged elements mounted on said annular frame at spaced intervals there-around, said series of sluices leading from said water source to locations respectively spaced around said channel forming stationary structure, each of said sluices terminating in a water discharging means positioned to direct water from the sluice against said water impinged elements of said rotatable annular frame to cause the frame to travel around said circular track in a horizontal plane, the closed bottom of the channel formed by said stationary structure receiving the water from said elements of the rotating annular frame there-above, and means providing a water discharging conduit from the bottom of said channel.

12. In a hydraulic engine, in combination, a stationary structure providing an annular open-top and substantially closed bottom annular channel, a circular track means in and around said channel in a horizontal plane, a water impelled unit embodying an annular frame movably mounted and confined in said channel on said track means for rotation thereon in a circular path in a horizontal plane, a series of water impinged elements mounted on said annular frame, a series of water delivering sluices leading from a source of water supply to locations respectively spaced around said circular channel and rotatable frame, each of said sluices provided with water discharging means constructed and arranged to direct water therefrom against said water impinged elements as the latter are moved therepast by rotation of said annular frame, means for controlling the flow of water through said sluices, respectively, and power transmitting mechanism operatively associated with said water impelled rotating annular frame unit.

13. In a hydraulic engine, in combination, a stationary structure providing an annular substantially unobstructed open top channel, a circular track means in and around said channel disposed in a horizontal plane, a water impelled unit embodying an annular frame member movably mounted and confined in said channel on said track means for rotation thereon in a circular path in a horizontal plane, a series of water engaged elements mounted on said rotary annular frame member, a series of water delivering sluices leading from a source of water supply to locations respectively spaced around said circular channel and rotatable frame member, each of said sluices terminating in water discharging means above said rotary annular frame member to direct water downwardly against said water engaged elements as the latter are moved therepast by rotation of said annular frame member, each sluice decreasing in width and increasing in depth from the water supply to its respective water discharging means, and means for controlling the flow of water through said sluices, respectively.

14. In a hydraulic engine, in combination, a circular track in a horizontal plane within a stationary structure, an annular rotatable frame member mounted for travel on said circular track in a horizontal plane within said stationary structure, a series of water engaged elements mounted on said annular frame at spaced intervals therearound, a series of water delivering sluices leading from a source of water supply to locations respectively spaced around said stationary structure and adjacent said annular rotatable frame, said sluices each terminating above the rotatable annular frame member in water delivering means positioned to direct water downwardly against said water engaged elements to cause rotation of said annular frame member, each sluice provided with means for diverting water therefrom in advance of the water delivering means for such sluices and each sluice decreasing in width and increasing in depth from said water diverting means to said water delivering means.

15. In a hydraulic engine, in combination, a circular track in a horizontal plane within a stationary structure, an annular rotatable frame member mounted for travel on said circular track in a horizontal plane within a stationary structure, an annular rotatable frame member mounted for travel on said circular track in a horizontal plane within said stationary structure, a series of water engaged elements mounted on said annular frame at spaced intervals therearound, a series of water delivering sluices leading from a source of water supply to locations respectively spaced around said stationary structure and adjacent said annular rotatable frame, said sluices each terminating in water delivering means positioned to direct water against said water engaged elements to cause rotation of said annular frame member, each sluice provided with means for diverting all of the water therefrom in advance of the water delivering means for such sluice and each sluice decreasing in width from its intake end to its water delivering means with the bottom wall of the sluice substantially flat between its intake end and said water diverting means, each sluice increasing in depth from its water diverting means to its water delivering means with the bottom wall of the sluice between such means formed concave and of gradually increasing radius of curvature toward the water delivering means.

16. In a hydraulic engine, in combination, a circular track in a horizontal plane within a stationary structure, an annular frame member mounted for travel in a circular path in a horizontal plane on said track, water engaging elements mounted on said annular frame member at spaced intervals there-around adapted to be engaged by water to impell the annular frame member, water delivering sluices leading from a source of water supply to locations respectively spaced around said stationary structure and adjacent said rotary annular frame member, each of said sluices terminating in a water delivering means for directing water against the water engaged elements of said annular frame member to impell the latter on and around said stationary track in a horizontal plane, a vertically disposed stationary column on the axis about which said frame member rotates, a member mounted on said column for rotation thereon about a vertical axis and radially disposed rod members disposed around and connected between said column mounted rotary member and said water impelled annular frame member.

17. In a hydraulic engine, in combination, a stationary structure providing an annular substantially open top channel providing a circular track means therein and there-around in a horizontal plane, a water impelled unit embodying an annular member rotatably mounted and confined on said track means within said annular channel for rotation thereon through a circular path in a horizontal plane, a series of water engaged elements mounted on said rotatable annular frame at spaced intervals therearound, normally stationary water delivering means located at spaced intervals around said annular member for directing water from above said member downwardly against said water engaged elements to cause rotation of said member in a desired direction in a horizontal plane on said circular track means, and means for supplying water to the said water delivering means.

GEORGE PAUL GEISSLER.